Patented Mar. 14, 1939

2,150,175

UNITED STATES PATENT OFFICE 2,150,175

GLUE AND METHOD OF MAKING

Irving F. Laucks and Glenn Davidson, Seattle, Wash., assignors to I. F. Laucks, Incorporated, Seattle, Wash., a corporation of Washington No Drawing. Application October 4, 1928, Serial No. 310,428. Renewed January 7, 1938

10 Claims. (Cl. 134—23.8)

The art of making a water-proof glue from certain protein materials has been known for some time; thus casein and blood albumin are in common use. These last mentioned compounds, however, have a number of disadvantages from a practical standpoint. Casein is costly and lack of uniformity in the material as derived from various sources is a serious detriment; while blood albumin is not available except in certain situations. There is accordingly a great demand, particularly in the veneer industry where large quantities of glue are consumed, for a new glue that will be cheap and at the same time sufficiently water-proof.

By water-proof, in this connection, it is not meant that glues thus characterized will resist the action of water indefinitely, but it is meant that they are water-proof in the sense in which the term is used in the veneer industry, viz., that a panel can be soaked in cold water for from seventy-two to one hundred hours, or in boiling water for eight hours, without separation.

Vegetable compounds have not, so far as we are aware, been heretofore satisfactorily employed as a basis for water-proof glues of the type in question. It is true that some veneer makers, on account of the high price of casein, have come to use starch glues but these, at least as heretofore made, are not at all water-proof, and vegetable proteins have not heretofore been used at all, so far as we are aware.

We have now discovered, however, that by subjecting the same to proper treatment, such vegetable proteins or vegetable matter containing proteins in proper amount can be converted into a water-proof glue that will satisfy the rigid requirements of veneer making. The requisite raw material may be derived from a number of sources and the treatment of such material is relatively simple and inexpensive to that as a result we are able to produce a satisfactory glue at a much lower cost than has heretofore been possible.

To the accomplishment of the foregoing and related ends, the invention, then, consists of the combination of ingredients or composition of matter and the steps involved in the preparation of such composition hereinafter fully described and particularly pointed out in the claims, it being understood that such disclosed ingredients and steps constitute but several of the various ways in which the principle of the invention may be used.

We have found that soya bean flour constitutes an admirable raw material for our purpose. Such flour is preferably made by grinding soya bean cake so that 80 per cent. will pass a 100 mesh screen and when treated with certain chemicals, or other substances, we make therefrom a very satisfactory glue that meets the requirements of the veneer trade fully and is in many respects better than the usual glues now on the market. Such bean cake, as analyzed by us, is found to contain on the average 45 per cent. protein, 12 per cent. water, 5 per cent. cellulose or crude fibre, 7 per cent. oil, 6 per cent. ash, and 25 per cent. carbohydrates.

We do not, however, wish to limit ourselves to soya bean flour or to vegetable protein derived from this source for we have made satisfactory glue by our improved process from a low grade wheat containing approximately 10 per cent. protein and there are many other vegetable materials containing protein which may be utilized with proportionate results.

Soya bean flour made from soya bean cake from which the oil has been expressed, is preferably used in practice because it is cheaper and makes a better glue, but flour made from whole soya beans, without expressing the contained oil, may also be used, although obviously this would not be economical in view of the value which attaches to such oil. As to the fineness of the flour, it is not necessary that the meal be ground as fine as indicated above, but fineness is desirable from a practical stand-point.

When the usual chemicals employed in making casein glue, viz., lime and sodium silicate, are added to a vegetable protein-containing material, for example, soya bean flour, a glue results, but it is not as good as casein glue. It is not as highly water resistant nor as workable. We find, however, by the use of caustic soda with such vegetable protein-containing matter, a much better glue is obtained, such caustic soda apparently playing the part of dispersing the colloidal material. The resultant glue is then somewhat similar in its working properties to casein glue, although its water resistance is still slightly less.

Preferably we react on our vegetable protein-containing material with both caustic soda and lime. As equivalents of such caustic soda, caustic potash may be used, although more expensive. Similarly in place of lime, magnesia, baryta and strontia may be used as equivalents.

In order to improve the water resisting properties, we have found it desirable to add carbon bisulfide.

Where however carbon bisulfide or equivalent is employed with a vegetable protein material, it exhibits a decided tendency to thicken up the protein glue. It accordingly is of importance to be able to control such thickening tendency. By suitable proportioning of the caustic soda content, this may be successfully managed, and the amount of caustic soda should be kept within the limits of about 3 to 17 per cent. with carbon bisulfide in amount of from 1 to 6 per cent. It will be understood that wherever a per cent. is mentioned in connection with formulae, it is on the basis of the flour content, or its equivalent where casein is employed.

Raising the percentage of caustic soda decreases the thickening tendency, while lowering the caustic increases the thickening tendency, the carbon bisulfide being kept constant. With constant caustic soda, increasing the carbon bisulfide increases the thickening tendency, and so on.

The degree of water resistance required determines the amount of carbon bisulfide necessary, and this having been determined, then the caustic soda is regulated to obtain proper working consistency.

For example a working formula is:—

100 parts soya bean flour, 3 parts lime, 8 parts caustic soda, 2 parts of a mixture of carbon bisulfide and carbon tetrachloride, in equal parts by volume, 10 parts sodium silicate (water glass.)

With this formula it is found for example that if the caustic soda is increased to 10 per cent. or over the thinning tendency is too great for a commercial veneer glue; that is it tends to thin so quickly that its working life is too short. On the other hand if the caustic is decreased to 6 per cent. then it soon thickens so much that it is not readily spreadable.

In the above formula the flour and lime are dry mixed and shipped to the user. When the glue is to be used 300 parts of water at 70° F. are placed in the mixer, start the mixer and add 100 lbs. of dry glue slowly to avoid lumps, stir 3 to 5 minutes (stir out any lumps), add 8 lbs. of caustic soda dissolved in 25 lbs. of water, stir 1 minute, add 10 lbs. silicate of soda, add 2 lbs. of tetrasulfide, stir 10 minutes, add 20 to 30 lbs. of water and the glue is ready for use.

If more carbon bisulfide is desired to be used than given above, for example 4 per cent. being found to be ample for commercial veneer, then a suitable percentage of caustic soda would be in the neighborhood of 12 per cent.

The thickening tendency also may be controlled by proper manipulation of the temperature of the mix, raising the temperature, cutting down the thickenig tendency, whereas lowering the temperature increases the thickening tendency. For example the above formula calls for the starting water at 70° F. In the summer time the water may be naturally hotter than this, and the glue consequently would be thinner than desired. The remedy is to raise the amount of carbon bisulfide or to decrease the caustic soda, if it is impracticable to cool the water. In some instances it is desired to incorporate casein also with the vegetable protein material, and the casein again has a tendency to thicken the glue, and particularly where used with compositions including carbon bisulfide or the like, this thickening tendency is more prominent. This tendency however as pointed out in the foregoing may be controlled with such compositions by means indicated above, and very favorable results are thus obtainable with compositions containing for example up to 40 parts casein to 60 parts of soya bean flour or the like.

In referring to the caustic soda as advisably limited to 3 to 17 per cent., it is to be understood that this means caustic soda over and above the amount necessary to neutralize any acid substances which might be present and which would neutralize certain amounts of the caustic soda. For instance, where boric acid or acid salts, or alum are present, portions of the effective caustic soda are lost. This type of glue however by proper allowance in this respect readily permits the addition of such supplementary substances.

This application is a continuation in part of our application Serial No. 671,381 filed Oct. 29, 1923 (Patent No. 1,689,732.)

Other modes of applying the principle of our invention may be employed instead of the one explained, change being made as regards the process herein disclosed or the materials employed in carrying out such process provided the stated ingredients and steps or the equivalent of such stated ingredients or steps be employed.

We therefore particularly ponit out and distinctly claim as our invention:—

1. A glue composition, comprising a vegetable protein material, an agent providing a sulfur derivative of carbonic acid, casein, and caustic soda sufficient to control thickening.

2. The process of making a glue, which comprises treating a vegetable protein material with casein and an agent providing a sulfur derivative of carbonic acid, and controlling thickening by selected amounts of caustic soda, and lime.

3. A glue composition, comprising a vegetable protein material, casein, an agent providing a sulphur derivative of carbon dioxide and having a side effect of thickening the glue, and alkaline means for controlling such thickening.

4. A glue composition, comprising a vegetable protein material, casein, an agent providing a sulphur derivative of carbonic acid and having a side effect of thickening the glue, and means for controlling such thickening, said means including selected amounts of caustic soda.

5. The process of making a glue, which comprises incorporating with a vegetable protein material casein and an agent providing a sulphur derivative of carbonic acid and controlling the tendency to thicken by the incorporation of selected amounts of an alkaline agent.

6. The process of making a glue, which comprises incorporating with a vegetable protein material casein and an agent providing a sulphur derivative of carbonic acid, and controlling tendency to thicken by the incorporation of selected amounts of caustic soda.

7. A glue consisting of a base comprising casein as a substantial ingredient, together with a substantial amount of a protein rich seed meal incorporated with an alkaline earth oxide and a water soluble alkali metal salt capable of reacting in the presence of water with the alkaline earth oxide, the said salt and oxide being in amount sufficient for the reaction products thereof in water solution to dissolve the casein and the protein of the meal combined with water and carbon disulphide, the glue being water-resisting and sufficiently fluent to be practically spreadable on wood layers.

8. A glue consisting of a base comprising casein as a substantial ingredient together with a substantial amount of protein rich seed meal incorporated with an alkaline earth oxide and a water soluble alkaline metal salt capable of reacting in the presence of water with the alkaline earth oxide, in amount sufficient for the reaction products in water solution to dissolve the casein and proteins of the protein rich seed meal, combined with water, a substantial amount of sodium silicate, and carbon disulphide, the glue being water-resisting and sufficiently fluent to be practically spreadable on wood layers.

9. A glue containing a vegetable protein, carbon bisulfide and a compound selected from a group consisting of caustic soda and caustic potash, the caustic compound being in amount to neutralize any acid substances present and to disperse the protein in order to render the adhesive of desirable consistency, and there being additional caustic compound present in amount effective to counteract the thickening effect of the carbon bisulfide, the caustic compound being present in greater amount than the carbon bisulfide and the range percentages of caustic compound and carbon bisulfide being respectively 3 to 17% caustic compound and up to 6% carbon bisulfide.

10. A glue containing soy bean protein, carbon bisulfide and a compound selected from a group consisting of caustic soda and caustic potash, the caustic compound being in amount to neutralize any acid substances present and to disperse the protein in order to render the adhesive of desirable consistency, and there being additional caustic compond present in amount effective to counteract the thickening effect of the carbon bisulphide, the caustic compound being present in greater amount than the carbon bisulfide and the range percentages of caustic compound and carbon bisulfide being respectively 3 to 17% caustic compound and up to 6% carbon bisulfide.

IRVING F. LAUCKS.
GLENN DAVIDSON.